(12) United States Patent
Nagatani

(10) Patent No.: US 10,922,417 B2
(45) Date of Patent: Feb. 16, 2021

(54) INFORMATION PROCESSING APPARATUS, INFORMATION PROCESSING METHOD, AND PROGRAM

(71) Applicant: NEC Corporation, Tokyo (JP)

(72) Inventor: Noboru Nagatani, Tokyo (JP)

(73) Assignee: NEC CORPORATION, Tokyo (JP)

(*) Notice: Subject to any disclaimer, the term of this patent is extended or adjusted under 35 U.S.C. 154(b) by 106 days.

(21) Appl. No.: 15/759,582

(22) PCT Filed: Aug. 24, 2016

(86) PCT No.: PCT/JP2016/074607
§ 371 (c)(1),
(2) Date: Mar. 13, 2018

(87) PCT Pub. No.: WO2017/047341
PCT Pub. Date: Mar. 23, 2017

(65) Prior Publication Data
US 2018/0260573 A1 Sep. 13, 2018

(30) Foreign Application Priority Data
Sep. 15, 2015 (JP) ................................. 2015-182073

(51) Int. Cl.
*G06F 21/55* (2013.01)
*G06F 21/56* (2013.01)
(Continued)

(52) U.S. Cl.
CPC ............ *G06F 21/577* (2013.01); *G06F 21/57* (2013.01); *G06F 21/55* (2013.01); *G06F 21/56* (2013.01);
(Continued)

(58) Field of Classification Search
CPC .................. G06F 21/577; G06F 21/55; G06F 2207/7219; G06F 2221/034; G06F 21/57;
(Continued)

(56) References Cited

U.S. PATENT DOCUMENTS 6,971,026 B1 11/2005 Fujiyama et al.
7,810,159 B2 * 10/2010 Bowden ................ G06F 21/568
726/25

(Continued)

FOREIGN PATENT DOCUMENTS

CN 102752142 A 10/2012
CN 102801739 A 11/2012
(Continued)

OTHER PUBLICATIONS

Japanese Office Action for JP Application No. 2017-539800 dated May 7, 2019 with English Translation.
(Continued)

*Primary Examiner* — Jayesh M Jhaveri

(57) ABSTRACT

An information processing apparatus (10) includes a selection reception unit (110) that receives an input indicating that at least one countermeasure is selected from among a plurality of countermeasures against vulnerability, a remaining terminal identification unit (120) that reads out terminal-specific countermeasure information, indicating a countermeasure applicable for each terminal against the vulnerability, from a storage unit that stores the terminal-specific countermeasure information, and identifies a remaining terminal which is a terminal that would be left with the vulnerability on the basis of the read-out terminal-specific countermeasure information, and a remaining terminal information providing unit (130) that provides the number of identified remaining terminals.

6 Claims, 24 Drawing Sheets

(51) Int. Cl.
  *G06F 21/57* (2013.01)
  *H04L 9/00* (2006.01)
  *H04L 29/06* (2006.01)

(52) U.S. Cl.
  CPC ........ *G06F 2221/034* (2013.01); *H04L 9/002* (2013.01); *H04L 63/14* (2013.01); *H04L 63/1441* (2013.01)

(58) Field of Classification Search
  CPC . G06F 21/56; H04L 9/00; H04L 29/06; H04L 63/14; H04L 63/1441; H04L 9/002
  See application file for complete search history.

(56) References Cited

U.S. PATENT DOCUMENTS

| | | | |
|---|---|---|---|
| 7,890,869 B1* | 2/2011 | Mayer | G06F 21/577 709/224 |
| 8,495,745 B1* | 7/2013 | Schrecker | G06F 21/577 726/25 |
| 10,152,302 B2* | 12/2018 | Dayan | G06F 7/544 |
| 2005/0005159 A1* | 1/2005 | Oliphant | H04L 63/1441 726/26 |
| 2005/0044389 A1* | 2/2005 | Oliphant | H04L 63/20 713/187 |
| 2005/0138416 A1 | 6/2005 | Qian et al. | |
| 2007/0204346 A1 | 8/2007 | Meier | |
| 2007/0255724 A1* | 11/2007 | Jung | H04L 63/1441 |
| 2008/0177994 A1 | 7/2008 | Mayer | |
| 2009/0282457 A1* | 11/2009 | Govindavajhala | G06F 21/577 726/1 |
| 2010/0325412 A1 | 12/2010 | Norrman et al. | |
| 2011/0119106 A1 | 5/2011 | Dahl et al. | |
| 2011/0138469 A1* | 6/2011 | Ye | G06F 21/577 726/25 |
| 2013/0191919 A1* | 7/2013 | Basavapatna | G06F 21/577 726/25 |
| 2013/0340084 A1 | 12/2013 | Schrecker et al. | |
| 2014/0173739 A1* | 6/2014 | Ahuja | G06F 21/577 726/25 |
| 2018/0041535 A1 | 2/2018 | Kishi et al. | |

FOREIGN PATENT DOCUMENTS

| | | |
|---|---|---|
| JP | 2001-101135 A | 4/2001 |
| JP | 2002-024526 A | 1/2002 |
| JP | 2006-040196 A | 2/2006 |
| JP | 2009-110177 A | 5/2009 |
| JP | 2012-022544 A | 2/2012 |
| JP | 5125069 B2 | 1/2013 |
| JP | 5304243 B2 | 10/2013 |
| JP | 5406195 B2 | 2/2014 |
| TW | 200521687 A | 7/2005 |
| TW | 200842736 A | 11/2008 |
| WO | 2016/140198 A1 | 9/2016 |

OTHER PUBLICATIONS

International Search Report for PCT Application No. PCT/JP2016/074607, dated Oct. 11, 2016.
Taiwan Office Action for TW Application No. 105127812 dated Dec. 25, 2018 with English Translation.
Singapore Office Action for SG Application No. 11201801843V dated Apr. 18, 2020.
Japanese Office Action for JP Application No. 2019-105528 dated Oct. 27, 2020 with English Translation.

* cited by examiner

FIG. 2

| VULNERABILITY DISPLAY SCREEN | | | | | |
|---|---|---|---|---|---|
| VULNERABILITY OUTLINE | | | | | |
| RISK PRESENT | POST-COUNTER -MEASURE REMAINING RISK | COUNTER -MEASURE (1) | COUNTER -MEASURE (2) | COUNTER -MEASURE (3) | |
| 90 | 90 | ☐ (28) | ☐ (69) | ☐ (15) | |
| COUNTER -MEASURE (1) | CONTENT DESCRIPTION OF COUNTERMEASURE (1) | | | | |
| COUNTER -MEASURE (2) | CONTENT DESCRIPTION OF COUNTERMEASURE (2) | | | | |
| COUNTER -MEASURE (3) | CONTENT DESCRIPTION OF COUNTERMEASURE (3) | | | | |

FIG. 3

| TERMINAL SPECIFICATION INFORMATION | APPLICABLE COUNTERMEASURE |
|---|---|
| TERMINAL A | COUNTERMEASURE (1), COUNTERMEASURE (3) |
| TERMINAL B | COUNTERMEASURE (2) |
| TERMINAL C | COUNTERMEASURE (3) |
| ⋮ | ⋮ |

FIG. 7

VULNERABILITY DISPLAY SCREEN

VULNERABILITY OUTLINE

| RISK PRESENT | POST-COUNTERMEASURE REMAINING RISK | | COUNTER-MEASURE (1) | COUNTER-MEASURE (2) | COUNTER-MEASURE (3) |
|---|---|---|---|---|---|
| | NUMBER OF RISKS | TERMINAL NAME | | | |
| 90 | 62 | TERMINAL B<br>TERMINAL C<br>TERMINAL D<br>TERMINAL E<br>⋮ | ■ | ☐(55) | ☐(9) |

| COUNTER-MEASURE (1) | CONTENT DESCRIPTION OF COUNTERMEASURE (1) |
|---|---|
| COUNTER-MEASURE (2) | CONTENT DESCRIPTION OF COUNTERMEASURE (2) |
| COUNTER-MEASURE (3) | CONTENT DESCRIPTION OF COUNTERMEASURE (3) |

FIG. 10

| TERMINAL SPECIFICATION INFORMATION | INFORMATION TYPE | TERMINAL DATA |
|---|---|---|
| TERMINAL A | OS TYPE | × × × |
| | OS VERSION | 6. 1 |
| | INSTALLED APPLICATION | SOFTWARE A, SOFTWARE B |
| TERMINAL B | ⋮ | ⋮ |
| ⋮ | | |

FIG. 11

| TERMINAL SPECIFICATION INFORMATION | CLASSIFICATION |
|---|---|
| TERMINAL A | SERVER |
| TERMINAL B | SERVER |
| TERMINAL C | SERVER |
| ⋮ | ⋮ |
| TERMINAL a | CLIENT |
| TERMINAL b | CLIENT |
| TERMINAL c | CLIENT |
| ⋮ | ⋮ |

FIG. 12

| | | RISK PRESENT | POST-COUNTER -MEASURE REMAINING RISK | COUNTER -MEASURE (1) | COUNTER -MEASURE (2) | COUNTER -MEASURE (3) |
|---|---|---|---|---|---|---|
| ENTIRETY | | 90 | 90 | | | |
| | SERVER | 10 | 10 | ☐(5) | ☐(4) | ☐(3) |
| | CLIENT | 80 | 80 | ☐(23) | ☐(65) | ☐(12) |

VULNERABILITY DISPLAY SCREEN

VULNERABILITY OUTLINE

| COUNTER -MEASURE (1) | CONTENT DESCRIPTION OF COUNTERMEASURE (1) |
|---|---|
| COUNTER -MEASURE (2) | CONTENT DESCRIPTION OF COUNTERMEASURE (2) |
| COUNTER -MEASURE (3) | CONTENT DESCRIPTION OF COUNTERMEASURE (3) |

FIG. 13

| | RISK PRESENT | POST-COUNTER -MEASURE REMAINING RISK | COUNTER -MEASURE (1) | COUNTER -MEASURE (2) | COUNTER -MEASURE (3) |
|---|---|---|---|---|---|
| ENTIRETY | 90 | 20 | | | |
| SERVER | 10 | 5 | ■ | □(4) | □(2) |
| CLIENT | 80 | 15 | □(14) | ■ | □(8) |

VULNERABILITY DISPLAY SCREEN

VULNERABILITY OUTLINE

| COUNTER -MEASURE (1) | CONTENT DESCRIPTION OF COUNTERMEASURE (1) |
|---|---|
| COUNTER -MEASURE (2) | CONTENT DESCRIPTION OF COUNTERMEASURE (2) |
| COUNTER -MEASURE (3) | CONTENT DESCRIPTION OF COUNTERMEASURE (3) |

FIG. 14

| TERMINAL SPECIFICATION INFORMATION | CLASSIFICATION |
|---|---|
| TERMINAL A | HIGH DEGREE OF PRIORITY |
| TERMINAL B | HIGH DEGREE OF PRIORITY |
| TERMINAL C | HIGH DEGREE OF PRIORITY |
| ⋮ | ⋮ |
| TERMINAL a | HIGH DEGREE OF PRIORITY |
| TERMINAL b | MEDIUM DEGREE OF PRIORITY |
| TERMINAL c | LOW DEGREE OF PRIORITY |
| ⋮ | ⋮ |

FIG. 15

| | VULNERABILITY DISPLAY SCREEN | | | | |
|---|---|---|---|---|---|
| VULNERABILITY OUTLINE | | | | | |

| | RISK PRESENT | POST-COUNTER-MEASURE REMAINING RISK | COUNTER-MEASURE (1) | COUNTER-MEASURE (2) | COUNTER-MEASURE (3) |
|---|---|---|---|---|---|
| ENTIRETY | 90 | 90 | | | |
| HIGH DEGREE OF PRIORITY | 20 | 20 | ☐(13) | ☐(9) | ☐(5) |
| MEDIUM DEGREE OF PRIORITY | 15 | 15 | ☐(5) | ☐(10) | ☐(5) |
| LOW DEGREE OF PRIORITY | 55 | 55 | ☐(10) | ☐(50) | ☐(5) |

| COUNTER-MEASURE (1) | CONTENT DESCRIPTION OF COUNTERMEASURE (1) |
|---|---|
| COUNTER-MEASURE (2) | CONTENT DESCRIPTION OF COUNTERMEASURE (2) |
| COUNTER-MEASURE (3) | CONTENT DESCRIPTION OF COUNTERMEASURE (3) |

FIG. 16

VULNERABILITY DISPLAY SCREEN

VULNERABILITY OUTLINE

| | RISK PRESENT | POST-COUNTER-MEASURE REMAINING RISK | COUNTER-MEASURE (1) | COUNTER-MEASURE (2) | COUNTER-MEASURE (3) |
|---|---|---|---|---|---|
| ENTIRETY | 90 | 67 | | | |
| HIGH DEGREE OF PRIORITY | 20 | 7 | ■ | □(6) | □(2) |
| MEDIUM DEGREE OF PRIORITY | 15 | 5 | □(5) | ■ | □(5) |
| LOW DEGREE OF PRIORITY | 55 | 55 | □(10) | □(50) | □(5) |

| COUNTER-MEASURE (1) | CONTENT DESCRIPTION OF COUNTERMEASURE (1) |
|---|---|
| COUNTER-MEASURE (2) | CONTENT DESCRIPTION OF COUNTERMEASURE (2) |
| COUNTER-MEASURE (3) | CONTENT DESCRIPTION OF COUNTERMEASURE (3) |

FIG. 17

| TERMINAL SPECIFICATION INFORMATION | CLASSIFICATION 1 | CLASSIFICATION 2 |
|---|---|---|
| TERMINAL A | SERVER | — |
| TERMINAL B | SERVER | — |
| TERMINAL C | SERVER | — |
| ⋮ | ⋮ | ⋮ |
| TERMINAL a | CLIENT | HIGH DEGREE OF PRIORITY |
| TERMINAL b | CLIENT | MEDIUM DEGREE OF PRIORITY |
| TERMINAL c | CLIENT | LOW DEGREE OF PRIORITY |
| ⋮ | ⋮ | ⋮ |

FIG. 18

VULNERABILITY DISPLAY SCREEN

VULNERABILITY OUTLINE

| | RISK PRESENT | POST-COUNTER-MEASURE REMAINING RISK | COUNTER-MEASURE (1) | COUNTER-MEASURE (2) | COUNTER-MEASURE (3) |
|---|---|---|---|---|---|
| ENTIRETY | 90 | 90 | | | |
| SERVER | 10 | 10 | ☐(5) | ☐(4) | ☐(3) |
| CLIENT | 80 | 80 | | | |
| HIGH DEGREE OF PRIORITY | 10 | 10 | ☐(8) | ☐(5) | ☐(2) |
| MEDIUM DEGREE OF PRIORITY | 15 | 15 | ☐(5) | ☐(10) | ☐(5) |
| LOW DEGREE OF PRIORITY | 55 | 55 | ☐(10) | ☐(50) | ☐(5) |

| COUNTER-MEASURE (1) | CONTENT DESCRIPTION OF COUNTERMEASURE (1) |
|---|---|
| COUNTER-MEASURE (2) | CONTENT DESCRIPTION OF COUNTERMEASURE (2) |
| COUNTER-MEASURE (3) | CONTENT DESCRIPTION OF COUNTERMEASURE (3) |

FIG. 19

| | RISK PRESENT | POST-COUNTER -MEASURE REMAINING RISK | COUNTER -MEASURE (1) | COUNTER -MEASURE (2) | COUNTER -MEASURE (3) |
|---|---|---|---|---|---|
| ENTIRETY | 90 | 67 | | | |
| SERVER | 10 | 5 | ■ | □(4) | □(2) |
| CLIENT | 80 | 62 | | | |
| HIGH DEGREE OF PRIORITY | 10 | 2 | ■ | □(2) | □(0) |
| MEDIUM DEGREE OF PRIORITY | 15 | 5 | □(5) | ■ | □(5) |
| LOW DEGREE OF PRIORITY | 55 | 55 | □(10) | □(50) | □(5) |

VULNERABILITY DISPLAY SCREEN

VULNERABILITY OUTLINE

| COUNTER -MEASURE (1) | CONTENT DESCRIPTION OF COUNTERMEASURE (1) |
|---|---|
| COUNTER -MEASURE (2) | CONTENT DESCRIPTION OF COUNTERMEASURE (2) |
| COUNTER -MEASURE (3) | CONTENT DESCRIPTION OF COUNTERMEASURE (3) |

FIG. 21

| TERMINAL SPECIFICATION INFORMATION | APPLICABLE COUNTERMEASURE |
|---|---|
| TERMINAL A | COUNTERMEASURE (1), COUNTERMEASURE (3) |
| TERMINAL B | COUNTERMEASURE (2) |
| TERMINAL C | COUNTERMEASURE (3) |
| TERMINAL D | COUNTERMEASURE (2), COUNTERMEASURE (3) |
| TERMINAL E | COUNTERMEASURE (1) |

FIG. 24

| TERMINAL SPECIFICATION INFORMATION | APPLICABLE COUNTERMEASURE |
|---|---|
| TERMINAL A | COUNTERMEASURE (1), COUNTERMEASURE (3) |
| TERMINAL B | COUNTERMEASURE (2) |
| TERMINAL C | COUNTERMEASURE (3) |
| TERMINAL D | COUNTERMEASURE (2), COUNTERMEASURE (3) |
| TERMINAL E | COUNTERMEASURE (3) |

INFORMATION PROCESSING APPARATUS, INFORMATION PROCESSING METHOD, AND PROGRAM

This application is a National Stage Entry of PCT/JP2016/074607 filed on Aug. 24, 2016, which claims priority from Japanese Patent Application 2015-182073 filed on Sep. 15, 2015, the contents of all of which are incorporated herein by reference, in their entirety.

TECHNICAL FIELD

The present invention relates to a technique for assisting a manager's decision-making relevant to a countermeasure against vulnerability.

BACKGROUND ART

An example of invention in which information of each terminal is collected, and countermeasures (measures) are drawn up against vulnerability present in each terminal is disclosed in, for example, the following Patent Documents 1 to 3. The following Patent Document 1 discloses a technique to analyze risk on the basis of the state of a system in operation, and to provide an optimum countermeasure method, in consideration of various restrictions imposed on the system in operation, from countermeasure alternatives for reducing the risk. In addition, the following Patent Document 2 discloses a technique allowing appropriate countermeasure to be drawn-up in a combination of countermeasures that can be taken in practice, in further consideration of a restriction such as an exclusive relationship between security countermeasures. The following Patent Document 3 discloses a system in which a set of countermeasures against a potential threat with respect to a technical system is ranked on the basis of effectiveness, and the highest-ranked set of countermeasures is applied.

RELATED DOCUMENTS

Patent Documents

[Patent Document 1] Japanese Patent No. 5304243
[Patent Document 2] Japanese Patent No. 5125069
[Patent Document 3] Japanese Patent No. 5406195

SUMMARY OF THE INVENTION

Technical Problem

Countermeasures other than patch application coping with vulnerability are dependent on the circumstances of terminals to be managed, and a single countermeasure may not be applicable to all terminals. For this reason, in a case where countermeasures are performed on a large number of terminals, it is necessary to plan countermeasures against vulnerability with respect to individual terminals, and a huge amount of operational cost is thus incurred. In addition, in a case where a plurality of applicable countermeasures are present, it is not clearly understood to what extent risk remains after arbitrary countermeasures are performed, and which countermeasures should be performed later. Hence, it has been difficult to draw up a plan of countermeasures.

An object of the present invention is to provide a technique to visualize which countermeasures are applicable to a large number of terminals and to what extent risk remains after countermeasure, and to thereby assist a security manager's decision-making.

Solution to Problem

According to the present invention, there is provided an information processing apparatus including: a selection reception unit that receives an input indicating that at least one countermeasure is selected from among a plurality of countermeasures against vulnerability; a remaining terminal identification unit that reads out terminal-specific countermeasure information, indicating a countermeasure applicable for each terminal against the vulnerability, from a storage unit that stores the terminal-specific countermeasure information, and identifies a remaining terminal which is a terminal that would be left with the vulnerability on the basis of the read-out terminal-specific countermeasure information; and a remaining terminal information providing unit that provides the number of identified remaining terminals.

According to the present invention, there is provided an information processing method performed by a computer, the method including: receiving an input indicating that at least one countermeasure is selected from among a plurality of countermeasures against vulnerability; reading out terminal-specific countermeasure information, indicating a countermeasure applicable for each terminal against the vulnerability, from a storage unit that stores the terminal-specific countermeasure information, and identifying a remaining terminal which is a terminal that would be left with the vulnerability on the basis of the read-out terminal-specific countermeasure information; and provide the number of identified remaining terminals.

According to the present invention, there is provided a program for causing a computer to function as: a selection reception unit that receives an input indicating that at least one countermeasure is selected from among a plurality of countermeasures against vulnerability; a remaining terminal identification unit that reads out terminal-specific countermeasure information, indicating a countermeasure applicable for each terminal against the vulnerability, from a storage unit that stores the terminal-specific countermeasure information, and identifies a remaining terminal which is a terminal that would be left with the vulnerability on the basis of the read-out terminal-specific countermeasure information; and a remaining terminal information providing unit that provides the number of identified remaining terminals.

Advantageous Effects of Invention

According to the present invention, it is possible to visualize which countermeasures are applicable to a large number of terminals and to what extent risk remains after countermeasure, and for a security manager to easily perform the drawing-up of countermeasures against vulnerability.

BRIEF DESCRIPTION OF THE DRAWINGS

The above and other objects, features and advantages will be made clearer from certain preferred embodiment described below, and the following accompanying drawings.

FIG. 2 is a diagram illustrating an example of a screen which is displayed on a display apparatus by the information processing apparatus.

FIG. 3 is a diagram illustrating an example of terminal-specific countermeasure information.

FIG. 7 is a diagram illustrating an example of a screen which is output by the information processing apparatus in a modification example of the first example embodiment.

FIG. 10 is a diagram illustrating an example of terminal information collected by a terminal information collection unit.

FIG. 11 is a diagram illustrating an example of classification information which is stored by a classification information storage unit.

FIG. 12 is a diagram illustrating an example of a screen which is generated by a display processing unit.

FIG. 13 is a diagram illustrating an example of information which is output by the remaining terminal information providing unit in accordance with selection inputs received in the screen of FIG. 12.

FIG. 14 is a diagram illustrating another example of classification information which is stored by the classification information storage unit.

FIG. 15 is a diagram illustrating another example of a screen which is generated by the display processing unit.

FIG. 16 is a diagram illustrating an example of information which is output by the remaining terminal information providing unit in accordance with selection inputs received in the screen of FIG. 15.

FIG. 17 is a diagram illustrating another example of classification information which is stored by the classification information storage unit.

FIG. 18 is a diagram illustrating another example of a screen which is generated by the display processing unit.

FIG. 19 is a diagram illustrating an example of information which is output by the remaining terminal information providing unit in accordance with selection inputs received in the screen of FIG. 18.

FIG. 21 is a diagram illustrating an example of terminal specification information stored in a vulnerability information storage unit.

FIG. 24 is a diagram illustrating an example of terminal specification information stored in the vulnerability information storage unit.

DESCRIPTION OF EMBODIMENTS

Figure 1:
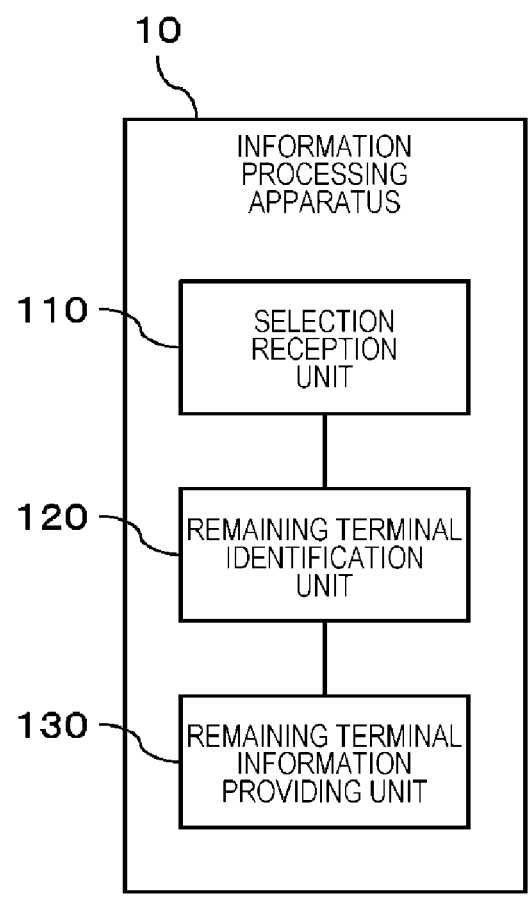
FIG. 1 is a diagram conceptually illustrating a process configuration of an information processing apparatus according to a first example embodiment of the present invention.

Hereinafter, example embodiments of the present invention will be described with reference to the accompanying drawings. In all the drawings, like elements are referenced by like reference numerals and the descriptions thereof will not be repeated.

First Example Embodiment

[Process Configuration]

FIG. 1 is a diagram conceptually illustrating a process configuration of an information processing apparatus 10 according to a first example embodiment of the present invention. As shown in FIG. 1, the information processing apparatus 10 of the present example embodiment includes a selection reception unit 110, a remaining terminal identification unit 120, and a remaining terminal information providing unit 130.

The selection reception unit 110 receives an input indicating that at least one countermeasure is selected from among a plurality of countermeasures against vulnerability. The selection reception unit 110 receives selection inputs of countermeasures against vulnerability through, for example, a screen as shown in FIG. 2. Here, examples of the countermeasures include the application of a security patch, the setting change of an application, a communication restriction due to the activation of a fire wall, and the like.

FIG. 2 is a diagram illustrating an example of a screen which is displayed on a display apparatus (not shown) by the information processing apparatus 10. In FIG. 2, a screen for displaying the number of terminals having vulnerability (risk), the number of remaining risks (terminals that would be left with vulnerability) after each of the countermeasures is selected, each of the countermeasures against vulnerability, and the number of terminals to which each of the countermeasures is applicable in association with each other are exemplified. A numeral written within parentheses of the field of the column of each countermeasure indicates the number of terminals to which a countermeasure corresponding to the column is applicable. In the screen example of FIG. 2, it can be understood that, among ninety terminals having vulnerability (risk), the number of terminals to which a countermeasure (1) is applicable is 28, the number of terminals to which a countermeasure (2) is applicable is 69, and the number of terminals to which the countermeasure (3) is applicable is 15. Note that the reason that a value obtained by adding up the number of terminals according to the countermeasures is different from the number (90) of terminals serving as a parameter is because terminals to which a plurality of countermeasures are applicable are present. In addition, the information processing apparatus 10 may generate a screen for displaying information (such as, for example, the terminal name or MAC address of each terminal) capable of specifying each terminal, instead of (or in addition to) the number of terminals.

The screen of FIG. 2 is generated by the information processing apparatus 10 on the basis of information (terminal-specific countermeasure information) indicating countermeasures applicable for each terminal against vulnerability, for example, as shown in FIG. 3. FIG. 3 is a diagram illustrating an example of terminal-specific countermeasure information. The terminal-specific countermeasure information includes terminal specification information (such as, for example, a media access control (MAC) address) for specifying each terminal and information indicating countermeasures applicable to each terminal. Here, the applicable countermeasure refers to a countermeasure by which vulnerability is eliminated in a case where the countermeasure is applied. The terminal-specific countermeasure information is generated by examining a terminal to be managed in advance on the basis of, for example, information (vulnerability information) indicating vulnerability, its countermeasure and the like, which is provided from each vendor or the like, and is stored in a predetermined storage unit (not shown). A storage unit that stores the terminal-specific countermeasure information as shown in FIG. 3 may be included in the information processing apparatus 10, and may be stored in another apparatus which is communicably connected to the information processing apparatus 10.

When the selection reception unit 110 receives selection inputs of countermeasures on the screen as shown in FIG. 2, described later, the remaining terminal identification unit 120 calculates results on the assumption that the countermeasures indicated by the selection inputs received by the selection reception unit 110 are executed, and the remaining terminal information providing unit 130 displays the results in the screen.

The remaining terminal identification unit 120 reads out terminal-specific countermeasure information from a predetermined storage unit (not shown), and identifies terminals that would be left with vulnerability (hereinafter, also denoted by remaining terminals) on the basis of the read-out terminal-specific countermeasure information. As described above, the terminal-specific countermeasure information is information indicating countermeasures applicable for each terminal against vulnerability, and is stored in a storage unit in formats as shown in FIG. 3. The remaining terminal identification unit 120 can identify terminals to which countermeasures indicated by selection inputs are applicable, from a correspondence relation between terminal specification information of the terminal-specific countermeasure information and applicable countermeasures as shown in FIG. 3. Simultaneously, the remaining terminal identification unit 120 can identify terminals that would be left with vulnerability (remaining terminals).

Figure 4:
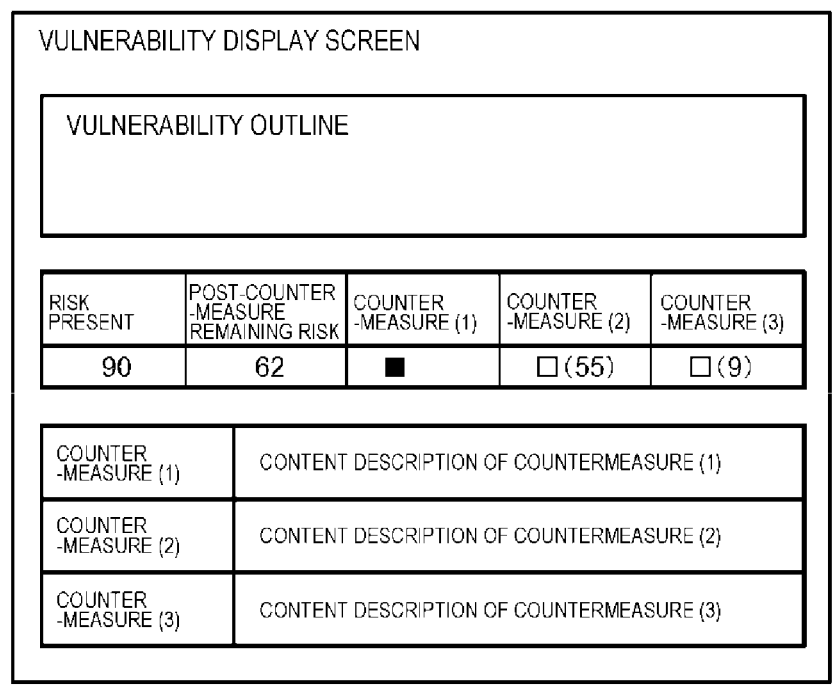
FIG. 4 is a diagram illustrating an example of information which is output by a remaining terminal information providing unit.

The remaining terminal information providing unit 130 provides the number of identified remaining terminals to, for example, a display apparatus or the like connected to the information processing apparatus 10. For example, the remaining terminal information providing unit 130 tallies up the number of remaining terminals identified by the remaining terminal identification unit 120, and displays the results in the screen of FIG. 2, as shown in FIG. 4. FIG. 4 is a diagram illustrating an example of information which is output by the remaining terminal information providing unit 130. In FIG. 4, a case where a "countermeasure (1)" is selected on the screen of FIG. 2 is exemplified. In this manner, when countermeasures against vulnerability are selected on a screen which is provided by the information processing apparatus 10, results on the assumption that the countermeasures are performed are displayed in the screen.

[Hardware Configuration]

Figure 5:
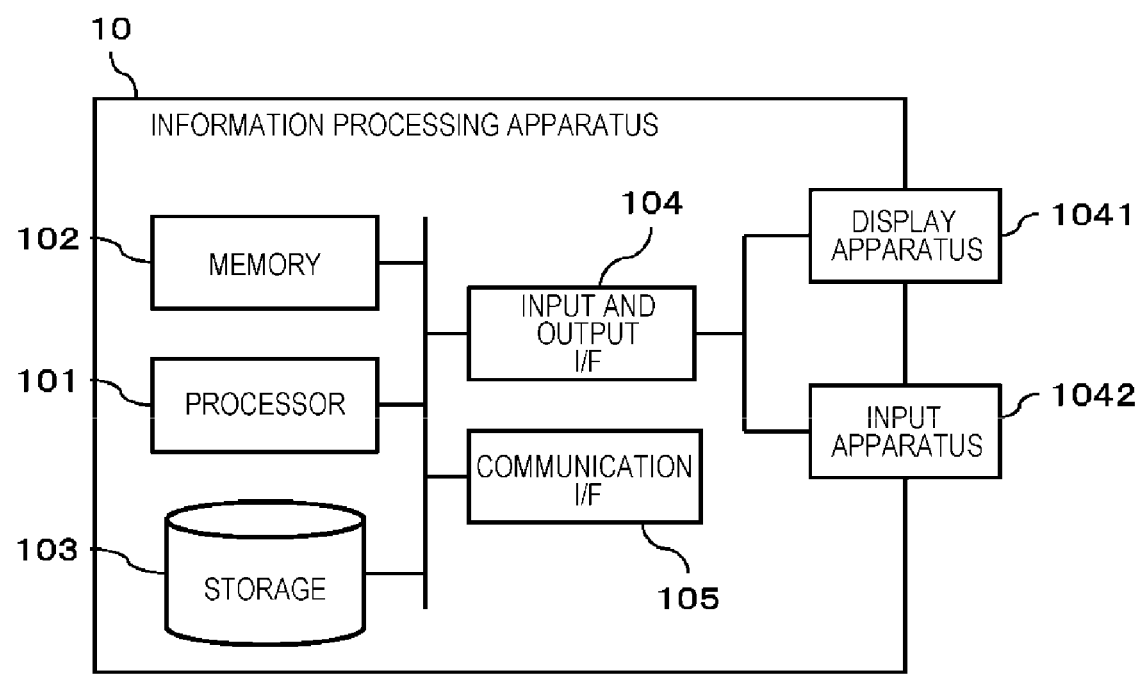
FIG. 5 is a diagram conceptually illustrating a hardware configuration of the information processing apparatus of the first example embodiment.

FIG. 5 is a diagram conceptually illustrating a hardware configuration of the information processing apparatus 10 of the first example embodiment.

The information processing apparatus 10 includes a processor 101, a memory 102, a storage 103, an input and output interface (input and output I/F) 1004, a communication interface (communication I/F) 105, and the like. The processor 101, the memory 102, the storage 103, the input and output interface 104, and the communication interface 105 are connected to each other by a data transmission channel for mutually transmitting and receiving data.

The processor 101 is an arithmetic processing apparatus such as, for example, a central processing unit (CPU), or a graphics processing unit (GPU). The memory 102 is a memory such as, for example, a random access memory (RAM) or a read only memory (ROM). The storage 103 is a storage apparatus such as, for example, a hard disk drive (HDD), a solid state drive (SSD), or a memory card. In addition, the storage 103 may be a memory such as a RAM or a ROM.

The storage 103 stores programs for implementing functions of the respective processing units (such as the selection reception unit 110, the remaining terminal identification unit 120, and the remaining terminal information providing unit 130) included in the information processing apparatus 10. The processor 101 realizes the functions of the respective processing units by executing these respective programs. Here, when the processor 101 executes the respective programs, these programs may be read out into the memory 102 and then be executed, and may executed without being read out into the memory 102.

The input and output interface 104 is connected to a display apparatus 1041, an input apparatus 1042 or the like. The display apparatus 1041 is an apparatus, such as liquid crystal display (LCD) or a cathode ray tube (CRT) display, which displays a screen corresponding to drawing data processed by the processor 101. The input apparatus 1042 is an apparatus that receives an operator's operation input, and is, for example, a keyboard, a mouse, a touch sensor, and the like. The display apparatus 1041 and the input apparatus 1042 may be formed integrally with each other, and be realized as a touch panel.

The communication interface 105 transmits and receives data to and from an external apparatus. For example, the communication interface 105 communicates with the external apparatus through a wired network or a wireless network.

It should be noted that the hardware configuration of the information processing apparatus 10 is not limited to the configuration shown in FIG. 5.

Operation Example

Figure 6:
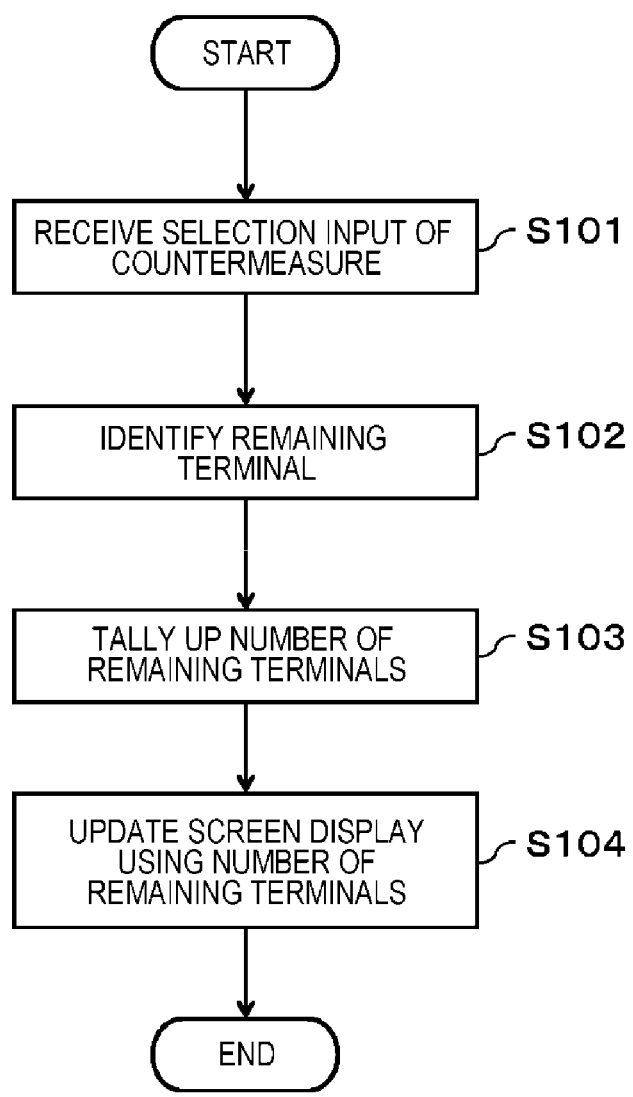
FIG. 6 is a flow diagram illustrating a flow of processes of the information processing apparatus according to the first example embodiment.

An operation example of the information processing apparatus 10 in the present example embodiment will be described with reference to FIG. 6. FIG. 6 is a flow diagram illustrating a flow of processes of the information processing apparatus 10 in the first example embodiment. Note that the following shows an example in which the remaining terminal information providing unit 130 tallies up the number of remaining terminals, and the result is displayed on a screen. Without being limited the following operation example, the remaining terminal information providing unit 130 may be configured to display information (such as a terminal name or a MAC address) for specifying each remaining terminal on a screen.

First, the selection reception unit 110 receives a user's input through the screen as shown in FIG. 2 (S101). The user's input is an input for selecting at least one countermeasure out of a plurality of countermeasures provided on the screen. The remaining terminal identification unit 120 refers to a storage unit that stores terminal-specific countermeasure information, using a countermeasure indicated by the input received by the selection reception unit 110 as a key, and identifies remaining terminals which are terminals that would be left with vulnerability (S102). For example, it is assumed that the storage unit has information shown in FIG. 3, and that the selection reception unit 110 receives an input indicating a "countermeasure (1)" is selected. In this case, the remaining terminal identification unit 120 identifies at least a "terminal B" and a "terminal C" as terminals (remaining terminals) to which the "countermeasure (1)" is not applicable. The remaining terminal information providing unit 130 then tallies up the number of remaining terminals identified in S102 (S103), and updates the screen using the result (S104).

Operation and Effects of First Example Embodiment

Hereinbefore, in the present example embodiment, the number of remaining terminals (remaining risks) on the assumption that the selected countermeasure is applied is provided to a security manager. Thereby, according to the present example embodiment, it is possible to exclude the ambiguity or complication of the drawing-up of vulnerability countermeasures due to the presence of terminals to which a plurality of countermeasures are applicable. As a result, it is possible for a security manager to easily draw up a plan of countermeasures against vulnerability. In addition, in the present example embodiment, in a case where a plurality of terminals having vulnerability are present, it is possible to visibly provide countermeasures against the vulnerability and the number of terminals to which each of the countermeasures is applicable. These pieces of information are helpful when a security manager draws up a plan against vulnerability.

Modification Example of First Example Embodiment

Figure 8:
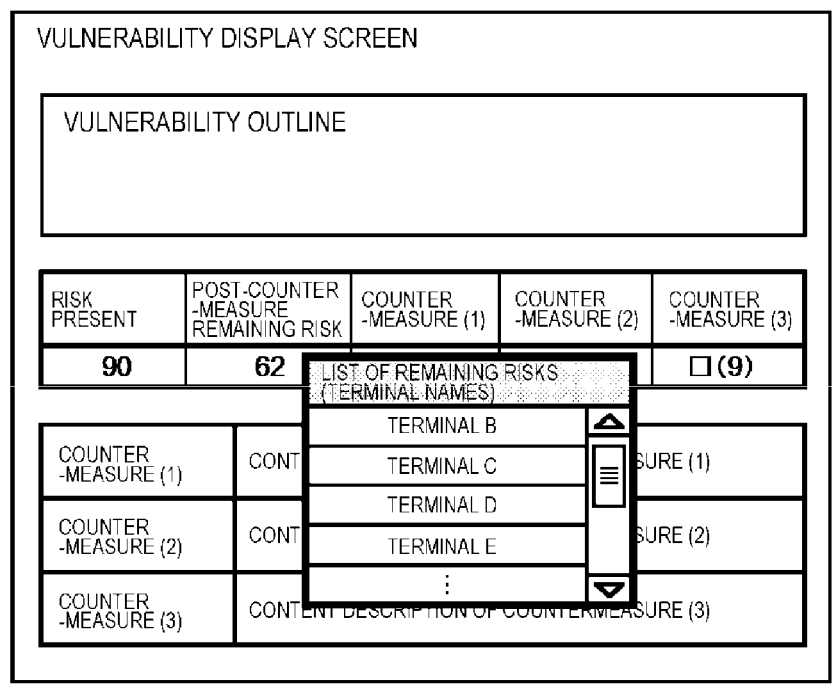
FIG. 8 is a diagram illustrating another example of a screen which is output by an information processing apparatus 10 in the modification example of the first example embodiment.

The remaining terminal information providing unit 130 may be configured to further provide information for specifying each of the identified remaining terminals, in addition to the number of remaining terminals identified by the remaining terminal identification unit 120. In this case, a screen as shown in FIG. 7 is output instead of, for example, the screen of FIG. 4. FIG. 7 is a diagram illustrating an example of a screen which is output by the information processing apparatus 10 in a modification example of the first example embodiment. FIG. 7 exemplifies a screen for displaying the number of remaining terminals identified and the terminal names of the remaining terminals together therewith. However, the displayed screen is not limited to the example of FIG. 7. For example, as shown in FIG. 8, the screen may be such a screen as that on which a list of information of remaining terminals is displayed in response to selection of a field of "remaining risk after countermeasure" on the screen of FIG. 4. FIG. 8 is a diagram illustrating another example of a screen which is output by the information processing apparatus 10 in the modification example of the first example embodiment. Further, the remaining terminal information providing unit 130 may perform grouping of remaining terminals using information or the like indicating the classification of the remaining terminals, and provide the result to a display apparatus. Thereby, it is possible to recognize a trend of the remaining terminals.

Second Example Embodiment

In the present example embodiment, the first example embodiment will be described in more detail.

[System Configuration]

Figure 9:
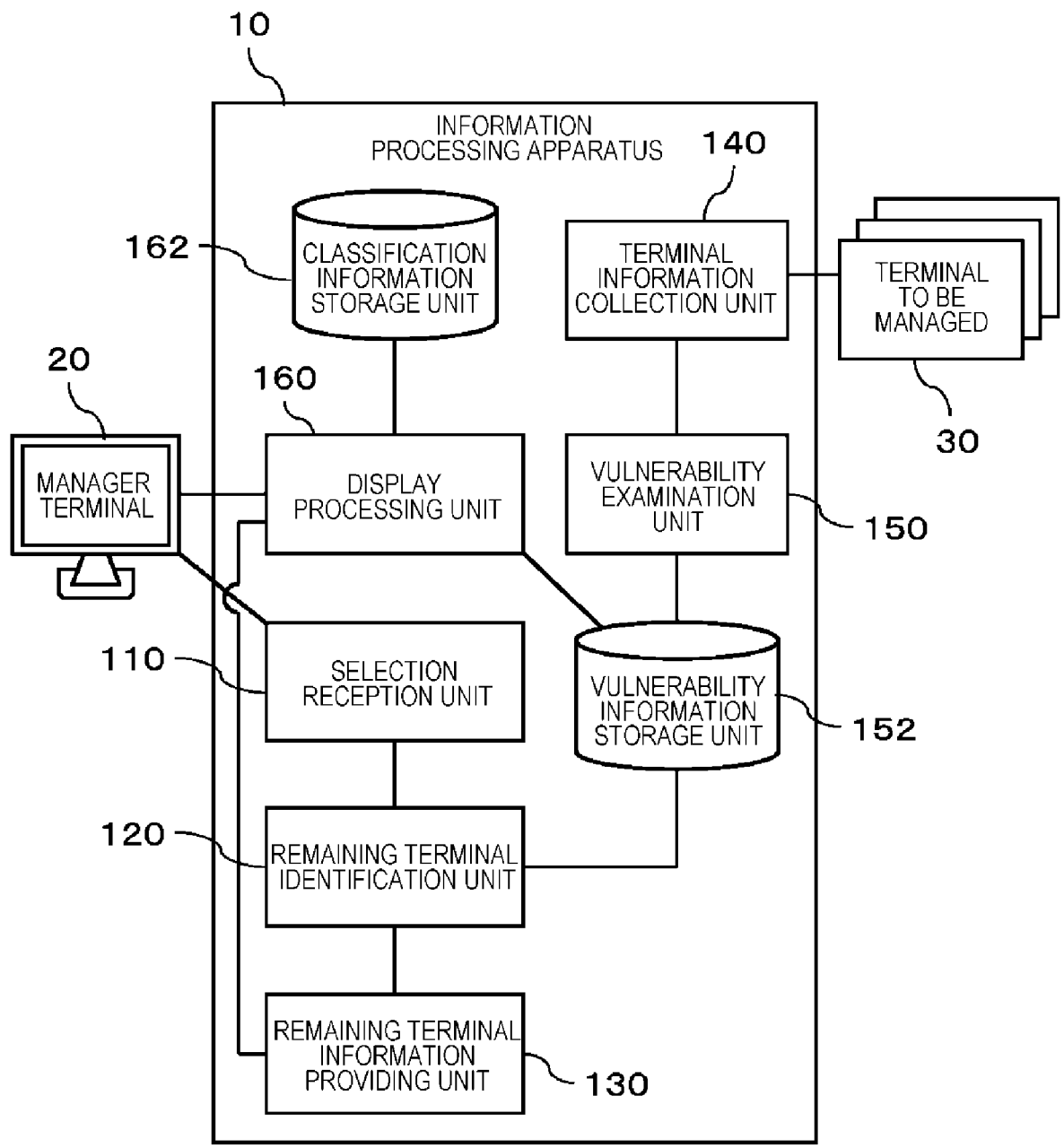
FIG. 9 is a diagram conceptually illustrating a system configuration of an information processing system of a second example embodiment.

FIG. 9 is a diagram conceptually illustrating a system configuration of an information processing system 1 of a second example embodiment. As shown in FIG. 9, the information processing system 1 is configured to include an information processing apparatus 10, manager terminal 20, and terminals 30 to be managed. The manager terminal 20 is a terminal which is operated by a security manager, and is a stationary personal computer (PC), a tablet terminal or the like. The terminal 30 to be managed is not only a client terminal, a server terminal, and a networking device such as a switch or a router on a network, but also every thing (thing included in the so-called Internet of things (IoT)) having a function for connection to a network or a unit communicating through a network.

[Process Configuration]

As shown in FIG. 9, the information processing apparatus 10 of the present example embodiment further includes a terminal information collection unit 140, a vulnerability examination unit 150, a vulnerability information storage unit 152, a display processing unit 160, and a classification information storage unit 162, in addition to the configuration of the first example embodiment.

The terminal information collection unit 140 collects terminal information from each of the terminals 30 to be managed, and obtains information as shown in FIG. 10. FIG. 10 is a diagram illustrating an example of terminal information collected by the terminal information collection unit 140. The terminal information includes, for example, the type of operating system (OS) of the terminal 30 to be managed, the version of OS, various types of applications installed in the terminal 30 to be managed, and the like. However, the terminal information is not limited to the information as exemplified in FIG. 10.

The vulnerability examination unit 150 examines a terminal 30 to be managed having vulnerability and generates vulnerability information including the terminal-specific countermeasure information as shown in FIG. 3, in light of the terminal information collected by the terminal information collection unit 140 and the vulnerability information provided from each vendor or the like. For example, the vulnerability information may further include information such as the outline of vulnerability or the description of each countermeasure, in addition to the terminal-specific countermeasure information as shown in FIG. 3. The vulnerability examination unit 150 stores the generated vulnerability information in the vulnerability information storage unit 152.

The display processing unit 160 generates a screen which is displayed on the display unit of the manager terminal 20 using the vulnerability information stored in the vulnerability information storage unit 152, and outputs the generated screen to the manager terminal 20. In the present example embodiment, the display processing unit 160 generates a screen for classifying and displaying, for example, terminals having vulnerability as shown in FIG. 12, using, for example, classification information of the classification information storage unit 162 as shown in FIG. 11. It is possible to grasp a trend of remaining terminals by using the classification information. FIG. 11 is a diagram illustrating an example of classification information which is stored by the classification information storage unit 162, and FIG. 12 is a diagram illustrating an example of a screen which is generated by the display processing unit 160. In the example of FIG. 11, the classification information storage unit 162 stores information (such as, for example, a MAC address) for specifying each terminal and classification ("server" or "client") to which the terminal belongs, in association with each other. The classification information is generated by, for example, a security manager in advance, and stored in the classification information storage unit 162. The display processing unit 160 generates a screen for displaying terminals 30 to be managed having vulnerability by classification into, for example, "server" and "client", as shown in FIG. 12, using the classification information shown in FIG. 11, and displays the generated screen on the display unit of the manager terminal 20. The security manager checks the screen displayed in the manager terminal 20, and performs a selection input of countermeasures applied to vulnerability. A result which is input herein is transmitted to the selection reception unit 110. In a case where the selection reception unit 110 receives the selection input, as described in the first example embodiment, the remaining terminal identification unit 120 identifies remaining terminals, and the remaining terminal information providing unit 130 displays the number thereof on, for example, the screen as shown in FIG. 13. FIG. 13 is a diagram illustrating an example of information which is output by the remaining terminal information providing unit 130 in accordance with the selection input received on the screen of FIG. 12. The selection reception unit 110 receives a selection input for each classification ("server" and "client") through the screen as shown in FIG. 12, and the remaining terminal identification unit 120 identifies remaining terminals for each classification on the basis of the selection input for each classification. As shown in FIG. 13, the remaining terminal information providing unit 130 then provides a screen for displaying the numbers of remaining terminals on the assumption that countermeasures selected for each classification are temporarily performed, and the number of remaining terminals obtained by adding up these numbers.

Here, another example of the screen which is generated by the display processing unit 160 will be described with reference to FIGS. 14 to 19. FIGS. 14 and 17 are diagrams illustrating another example of classification information which is stored by the classification information storage unit 162, and FIGS. 15 and 18 are diagrams illustrating another example of the screen which is generated by the display processing unit 160. In addition, FIG. 16 is a diagram illustrating an example of information which is output by the remaining terminal information providing unit 130 in accordance with selection inputs received on a screen of FIG. 15, and FIG. 19 is a diagram illustrating an example of information which is output by the remaining terminal information providing unit 130 in accordance with selection inputs received on a screen of FIG. 18.

In the example shown in FIG. 14, the classification information storage unit 162 stores information indicating the degree of priority (importance) of each terminal as the classification information. For example, a terminal having personal information stored therein is set to have "degree of priority: high", and a terminal having only public information stored therein is set to have "degree of priority: low". The display processing unit 160 generates a screen for displaying terminals 30 to be managed having vulnerability by classification into degrees of priority (for example, high/medium/low), for example, as shown in FIG. 15, using the classification information shown in FIG. 14. The selection reception unit 110 receives a selection input for each classification (degrees of priority "high/medium/low") through the screen as shown in FIG. 15, the remaining terminal identification unit 120 identifies remaining terminals for each classification on the basis of the selection input for each classification. As shown in FIG. 16, the remaining terminal information providing unit 130 then provides a screen for displaying the numbers of remaining terminals on the assumption that countermeasures selected for each classification are performed, and the number of remaining terminals obtained by adding up these numbers. In addition, in the example shown in FIG. 17, the classification information storage unit 162 stores two types of classification information (the type of terminal and the degree of priority). The display processing unit 160 generates, for example, a screen as shown in FIG. 18, using the classification information shown in FIG. 17. In the screen of FIG. 18, the terminals 30 to be managed having vulnerability are first classified into a "server" and a "client", and the terminals 30 to be managed belonging to the "client" are further classified according to the magnitude of the degree of priority. The selection reception unit 110 receives a selection input for each classification ("server" or "client" or in a case of "client", the degrees of priority "high/medium/low") through the screen as shown in FIG. 18, and the remaining terminal identification unit 120 identifies remaining terminals for each classification on the basis of the selection input for each classification. As shown in FIG. 19, the remaining terminal information providing unit 130 then provides a screen for displaying the numbers of remaining terminals on the assumption that e countermeasures selected for each classification are performed, and the number of remaining terminals obtained by adding up these numbers. Here, as shown in FIG. 18, the remaining terminal information providing unit 130 can also provide not only the entire number of remaining terminals, but also the number of remaining terminals relating to the classification of the "client" further classified according to the degree of priority.

[Hardware Configuration]

The information processing apparatus 10 of the present example embodiment has the same hardware configuration as that in the first example embodiment. The storage 103 further stores programs for realizing functions of the respective processing units (the terminal information collection unit 140, the vulnerability examination unit 150, and the display processing unit 160) of the present example embodiment, and the respective processing units of the present example embodiment are realized by the processor 101 executing these programs. In addition, the memory 102 or the storage 103 also serves as the vulnerability information storage unit 152 and the classification information storage unit 162.

Operation Example

Figure 20:
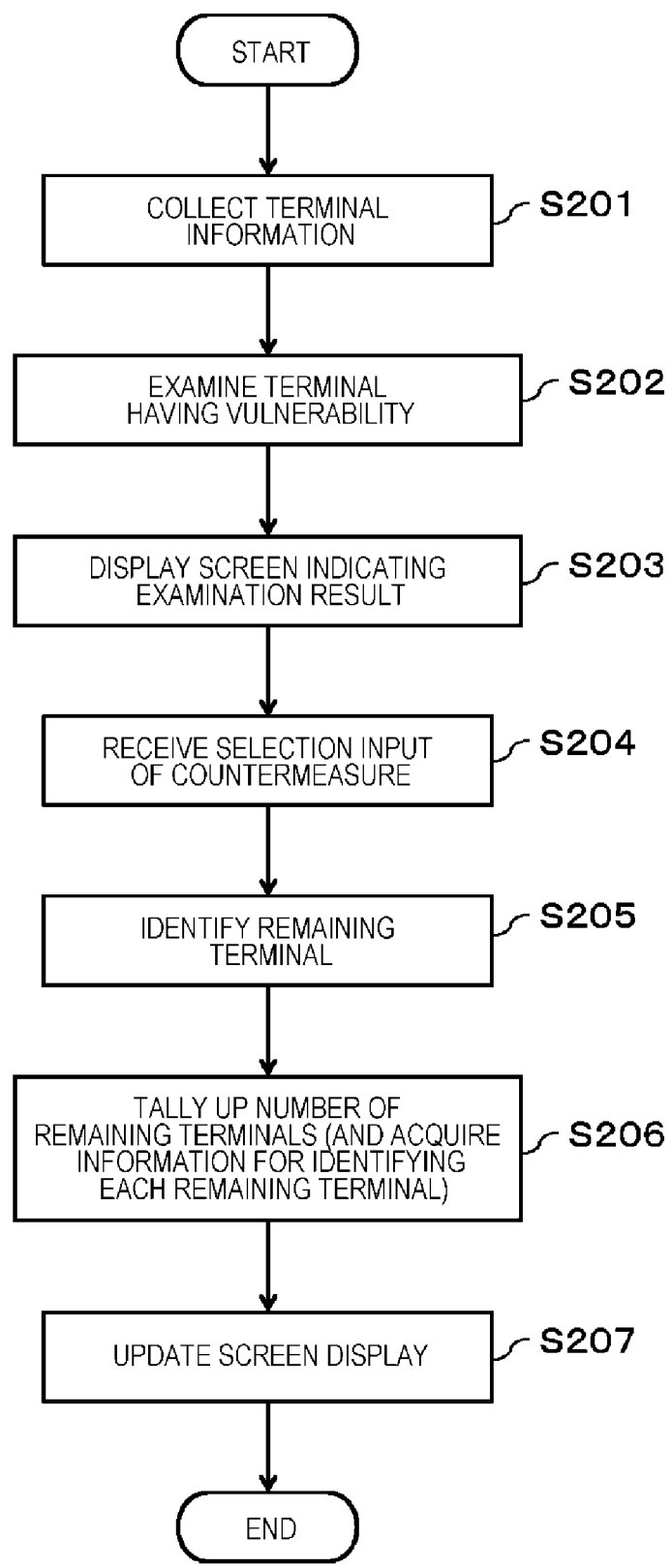
FIG. 20 is a flow diagram illustrating a flow of processes of an information processing apparatus according to the second example embodiment.

An operation example of the information processing apparatus 10 in the present example embodiment will be described with reference to FIG. 20. FIG. 20 is a flow diagram illustrating a flow of processes of the information processing apparatus 10 in the second example embodiment.

The terminal information collection unit 140 collects the terminal information of each terminal 30 to be managed, for example, in accordance with a screen display request from the manager terminal 20 (S201). The vulnerability examination unit 150 examines terminals 30 to be managed having vulnerability, for example, on the basis of the collected terminal information of each terminal 30 to be managed, and generates vulnerability information (S202). The vulnerability examination unit 150 can identify terminals 30 to be managed having vulnerability, applicable countermeasures and the like, for example, in light of the collected terminal information of each terminal 30 to be managed and the vulnerability information provided from each vendor or the like. Note that the processes of S201 and S202 may be executed in advance before the screen display request from the manager terminal 20 is received. In this case, the following process of S203 is executed in accordance with the screen display request from the manager terminal 20.

The display processing unit 160 generates a screen (for example, screen of FIG. 12) for displaying a result obtained by examining terminals having vulnerability on the basis of the vulnerability information generated in S202 and the classification information stored in the classification information storage unit 162, and displays the generated screen on the display unit of the manager terminal 20 (S203). A security manager who operates the manager terminal 20 checks the contents of the displayed screen, and performs an input operation of selecting at least one of a plurality of countermeasures. The selection reception unit 110 receives information, indicating a countermeasure selected by the input operation in the manager terminal 20, from the manager terminal 20 (S204). The remaining terminal identification unit 120 identifies remaining terminals on the basis of the information indicating a countermeasure selected by the manager terminal 20 and the terminal-specific countermeasure information (S205).

Figure 22:
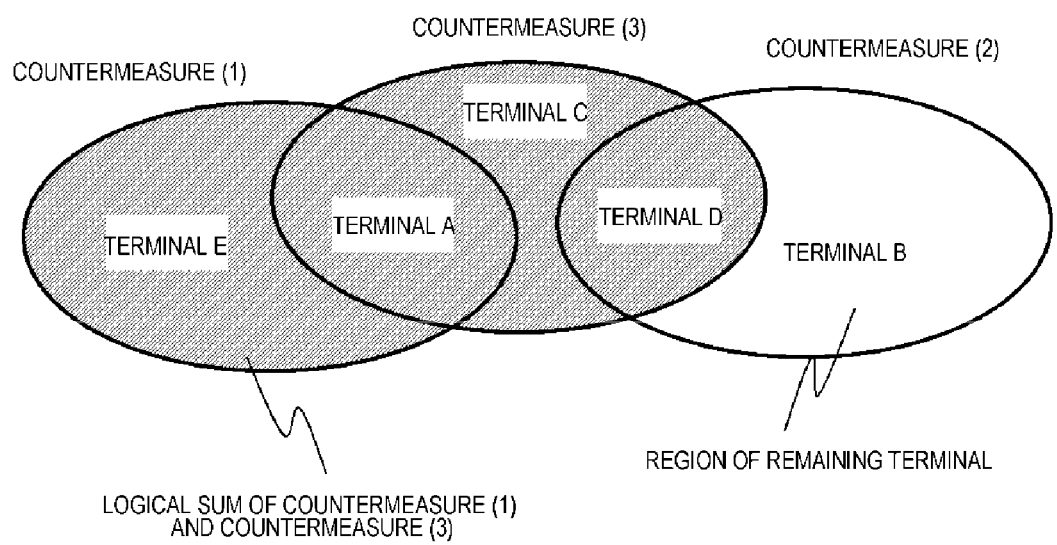
FIG. 22 is a diagram schematically illustrating processes of a remaining terminal identification unit of a third example embodiment.

It should be noted that, in a case where an operation of selecting a plurality of countermeasures is performed in the manager terminal 20, the remaining terminal identification unit 120 identifies remaining terminals as follows. First, the remaining terminal identification unit 120 identifies terminals to which each of the plurality of countermeasures selected is applicable. Here, it is assumed that the vulnerability information storage unit 152 stores vulnerability information including the terminal-specific countermeasure information as shown in FIG. 21, and that the selection reception unit 110 receives an input indicating that a countermeasure (1) and a countermeasure (3) are selected. FIG. 21 is a diagram illustrating an example of terminal specification information stored in the vulnerability information storage unit 152. In this case, the remaining terminal identification unit 120 identifies that terminals to which the countermeasure (1) is applicable are a terminal A and a terminal E, and that terminals to which the countermeasure (3) is applicable are a terminal C and a terminal D, on the basis of the terminal-specific countermeasure information. The remaining terminal identification unit 120 identifies the remaining terminals on the basis of the logical sum of the terminals identified for each of the countermeasures. In the example exemplified herein, as the logical sum of the terminals to which the countermeasure (1) is applicable and the terminals to which the countermeasure (3) is applicable, the terminal A, the terminal C, the terminal D, and the terminal E are identified. As a result, the terminal B is identified as the remaining terminal. This process of the remaining terminal identification unit 120 can be shown as FIG. 22. FIG. 22 is a diagram schematically illustrating a process of the remaining terminal identification unit 120 of a third example embodiment.

The remaining terminal information providing unit 130 tallies up the number of remaining terminals identified in S205, and outputs the tallied-up number to the display processing unit 160 (S206). Here, the remaining terminal information providing unit 130 may further acquire information (such as, for example, terminal name and MAC address) for specifying each remaining terminal identified in S205 and output the acquired information to the display processing unit 160. The display processing unit 160 updates the screen displayed in the manager terminal 20 on the basis of the information from the remaining terminal information providing unit 130 (S207).

Hereinbefore, according to the present example embodiment, it is possible to obtain the same effect as that in the first example embodiment.

Third Example Embodiment

In the present example embodiment, the information processing apparatus 10 further having a function of making the draw-up of a plan against vulnerability efficient will be described below.

[Process Configuration]

Figure 23:
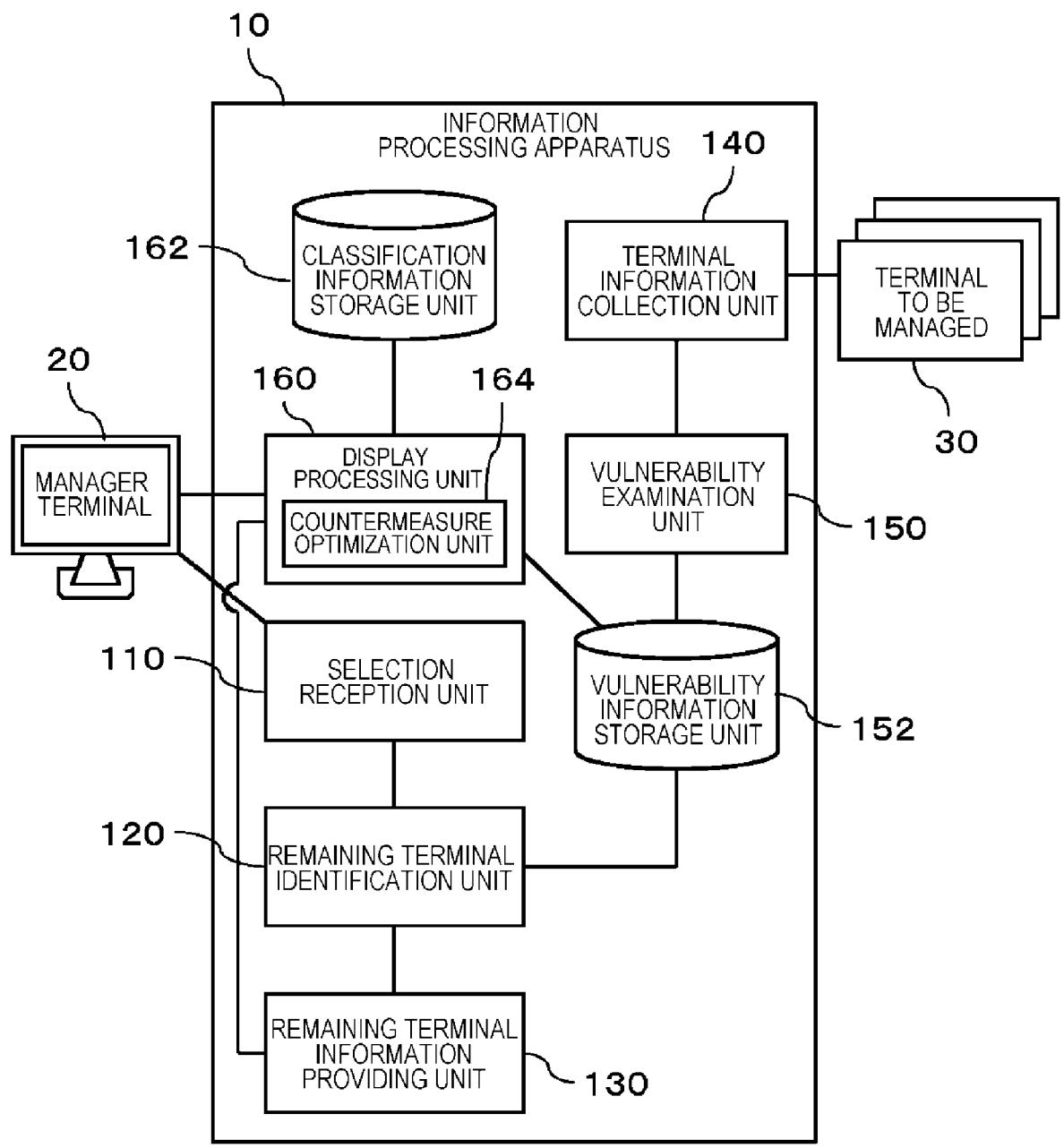
FIG. 23 is a diagram conceptually illustrating a process configuration of an information processing apparatus of the third example embodiment.

FIG. 23 is a diagram conceptually illustrating a process configuration of an information processing apparatus 10 of the third example embodiment. As shown in FIG. 23, the information processing apparatus 10 of the present example embodiment includes a countermeasure optimization unit 164 in addition to the configuration of the second example embodiment.

The countermeasure optimization unit 164 identifies combinations of countermeasures in which the number of remaining terminals identified by the remaining terminal identification unit 120 is the smallest, on the basis of the terminal-specific countermeasure information. For example, it is assumed that the terminal-specific countermeasure information as shown in FIG. 24 is held. FIG. 24 is a diagram illustrating an example of terminal specification information stored in the vulnerability information storage unit. In this case, the combinations of countermeasures in which the number of remaining terminals is the smallest are a combination of the countermeasure (2) and the countermeasure (3) or a combination the countermeasure (1), the countermeasure (2) and the countermeasure (3), and the countermeasure optimization unit 164 determines these combinations as "combinations of countermeasures in which the number of remaining terminals is the smallest".

In addition, as in this example, in a case where there are a plurality of "combinations of countermeasures in which the number of remaining terminals is the smallest", the countermeasure optimization unit 164 may be configured to determine a combination in which the number of countermeasures is the smallest among the determined combinations. In the example exemplified herein, the countermeasure optimization unit 164 determines a combination of the countermeasure (2) and the countermeasure (3) as the combination in which "the number of countermeasures is the smallest".

The countermeasure optimization unit 164 displays the determined "combinations of countermeasures in which the number of remaining terminals is the smallest" or the "combination in which the number of countermeasures is the smallest" among them, in the screen displayed in the manager terminal 20. The countermeasure optimization unit 164 highlights the determined "combinations of countermeasures in which the number of remaining terminals is the smallest" or the "combination in which the number of countermeasures is the smallest" among them, on the screen displayed in the manager terminal 20, for example, at the time of initially displaying a screen in the manager terminal 20, or in accordance with pressing down of a predetermined button provided on the screen. An operator of the manager terminal 20 can select countermeasures to be performed by referring to the information provided from the countermeasure optimization unit 164. In addition, without being limited thereto, the countermeasure optimization unit 164 may use the determined "combinations of countermeasures in which the number of remaining terminals is the smallest" or the "combination in which the number of countermeasures is the smallest" among them, as an automatic selection input for the screen displayed in the manager terminal 20. In this case, the selection reception unit 110 receives the countermeasures automatically selected by the countermeasure optimization unit 164 as an input, and the remaining terminal identification unit 120 identifies remaining terminals on the assumption that the selected countermeasures are executed. The remaining terminal information providing unit 130 tallies up the number of remaining terminals identified by the remaining terminal identification unit 120 and displays the tallied-up number in the screen. An operator of the manager terminal 20 checks contents displayed in the screen, and manually changes the selection contents if necessary.

[Hardware Configuration]

The information processing apparatus 10 of the present example embodiment has the same hardware configuration as that in the first example embodiment. The storage 103 further stores programs for realizing a function of the countermeasure optimization unit 164 of the present example embodiment, and the countermeasure optimization unit 164 of the present example embodiment is realized by the processor 101 executing these programs.

Hereinbefore, according to the present example embodiment, at least the "combinations of countermeasures in which the number of remaining terminals is the smallest" are determined, and are set on the screen displayed in the manager terminal 20, at the time of initial display of the screen or in accordance with a predetermined operation. In addition, according to the present example embodiment, the "combination in which the number of countermeasures is the smallest" is further determined, and is set on the screen displayed in the manager terminal 20. Thereby, it is possible to provide effective combinations of countermeasures from the information processing apparatus 10 to a security manager, and to reduce time and labor for a security manager to be taken to work.

Hereinbefore, although the example embodiments of the present invention have been set forth with reference to the accompanying drawings, the example embodiments are merely illustrative of the present invention, and various configurations other than those stated above can be adopted.

For example, in each of the above-described example embodiments, a button for executing a countermeasure with respect to each terminal to be managed on the basis of the contents selected on the screen may be further provided on the screen. In a case where the button is pressed down, the information processing apparatus 10 generates a command for causing each terminal to execute a countermeasure in accordance with the selected contents, and outputs the generated command toward each terminal.

In addition, in each of the example embodiments described above, an aspect has been described in which the number of remaining terminals is provided. However, it is also possible to provide an index relating to the remaining terminals. The index relating to the remaining terminals includes, for example, a ratio of the number of remaining terminals to the number of terminals having vulnerability (risk), a color according to the ratio, or the like.

In addition, in each of the example embodiments described above, an aspect has been described in which the number of remaining terminals is provided in accordance with a selection input of countermeasures against vulnerability. However, for example, in a case where the number of applicable countermeasures is small, or the like, it is also possible to provide the number of remaining terminals on the assumption that all the countermeasures are applied, from the beginning, regardless of the selection input.

In addition, in each of the example embodiments described above, an aspect has been described in which the terminal-specific countermeasure information generated by examining terminals to be managed in advance is read out from the storage unit, and the remaining terminals which are terminals that would be left with vulnerability are identified on the basis of the read-out terminal-specific countermeasure information. However, it is also possible to acquire the terminal-specific countermeasure information by examining the terminals to be managed when the remaining terminals are identified.

In addition, in a plurality of flow diagrams using the aforementioned description, a plurality of steps (processes) are described in order, but the execution order of processes which are executed in each example embodiment is not limited to the described order. In each example embodiment, the order of processes shown can be changed within a range without causing any problem in terms of contents. In addition, each example embodiment described above can be combined in a range consistent with the contents thereof.

Hereinafter, examples of reference forms are appended.

1. An information processing apparatus including:
a selection reception unit that receives an input indicating that at least one countermeasure is selected from among a plurality of countermeasures against vulnerability;
a remaining terminal identification unit that reads out terminal-specific countermeasure information, indicating a countermeasure applicable for each terminal against the vulnerability, from a storage unit that stores the terminal-specific countermeasure information, and identifies a remaining terminal which is a terminal that would be left with the vulnerability on the basis of the read-out terminal-specific countermeasure information; and
a remaining terminal information providing unit that provides the number of identified remaining terminals.

2. The information processing apparatus according to 1, wherein the remaining terminal information providing unit outputs information for specifying each of the identified remaining terminals, in addition to the number of the identified remaining terminals.

3. The information processing apparatus according to 1 or 2,
wherein in a case where a plurality of countermeasures are selected by the selection reception unit, the remaining terminal identification unit identifies a terminal to which each of the selected plurality of countermeasures is applicable, on the basis of the terminal-specific countermeasure information, and identifies the remaining terminal using a logical sum of terminals identified for each of the countermeasures.

4. The information processing apparatus according to any one of 1 to 3, further including a countermeasure optimization unit that determines a combination of countermeasures in which the number of the remaining terminals is the smallest, on the basis of the terminal-specific countermeasure information.

5. The information processing apparatus according to 4, wherein among combinations of countermeasures in which the number of the remaining terminals is the smallest, the countermeasure optimization unit determines a combination in which the number of countermeasures included in the combination is the smallest.

6. An information processing method performed by a computer, the method including:
receiving an input indicating that at least one countermeasure is selected from among a plurality of countermeasures against vulnerability;
reading out terminal-specific countermeasure information, indicating a countermeasure applicable for each terminal against the vulnerability, from a storage unit that stores the terminal-specific countermeasure information, and identifying a remaining terminal which is a terminal that would be left with the vulnerability on the basis of the read-out terminal-specific countermeasure information; and
providing the number of identified remaining terminals.

7. The information processing method performed by the computer according to 6, the method including outputting information for specifying each of the identified remaining terminals, in addition to the number of the identified remaining terminals.

8. The information processing method performed by the computer according to 6 or 7, the method including, in a case where a plurality of countermeasures are selected by the selection reception unit, identify a terminal to which each of the selected plurality of countermeasures is applicable, on the basis of the terminal-specific countermeasure information, and identify the remaining terminal using a logical sum of terminals identified for each of the countermeasures.

9. The information processing method performed by the computer according to any one of 6 to 8, the method including determining a combination of countermeasures in which the number of the remaining terminals is the smallest, on the basis of the terminal-specific countermeasure information.

10. The information processing method performed by the computer according to 9, the method including determining, among combinations of countermeasures in which the number of the remaining terminals is the smallest, a combination in which the number of countermeasures included in the combinations is the smallest.

11. A program for causing a computer to function as:
a selection reception unit that receives an input indicating that at least one countermeasure is selected from among a plurality of countermeasures against vulnerability;
a remaining terminal identification unit that reads out terminal-specific countermeasure information, indicating a countermeasure applicable for each terminal against the vulnerability, from a storage unit that stores the terminal-specific countermeasure information, and identifies a remaining terminal which is a terminal that would be left with the vulnerability on the basis of the read-out terminal-specific countermeasure information; and
a remaining terminal information providing unit that provides the number of identified remaining terminals.

12. The program according to 11, causing the computer to function as:
the remaining terminal information providing unit that outputs information for specifying each of the identified remaining terminals, in addition to the number of the identified remaining terminals.

13. The program according to 11 or 12, causing the computer to function as:
the remaining terminal identification unit that identifies, in a case where a plurality of countermeasures are selected by the selection reception unit, a terminal to which each of the selected plurality of countermeasures is applicable, on the basis of the terminal-specific countermeasure information, and identifies the remaining terminal using a logical sum of terminal identified for each of the countermeasures.

14. The program according to any one of 11 to 13, causing the computer to further function as a countermeasure optimization unit that determines a combination of countermeasures in which the number of the remaining terminals is the smallest, on the basis of the terminal-specific countermeasure information.

15. The program according to 14, causing the computer to function as:
the countermeasure optimization unit that determines, among combinations of countermeasures in which the number of the remaining terminals is the smallest, a combination in which the number of countermeasures included in the combination is the smallest.

This application is based on Japanese Patent Application No. 2015-182073 filed on Sep. 15, 2015, the content of which is incorporated hereinto by reference.

What is claimed is:

1. An information processing apparatus comprising:
a memory storing one or more instructions; and
a processor configured to execute the one or more instructions to:
receive an input indicating that at least one countermeasure is selected from among a plurality of countermeasures against vulnerability;
read out terminal-specific countermeasure information, indicating a countermeasure applicable for each of a plurality of terminals against the vulnerability, from a storage that stores the terminal-specific countermeasure information, and based on assumption that the selected countermeasure is applied to the plurality of terminals, identify remaining terminals from among the plurality of terminals which are terminals that would be left with the vulnerability due to non-applicability of the selected countermeasure based on the read-out terminal-specific countermeasure information;
count a number of terminals identified as the remaining terminals; and
display a screen including first information indicating the number of remaining terminals,
wherein the processor is further configured to determine one or more combinations of countermeasures in which the number of the remaining terminals is the smallest on the basis of the terminal specific countermeasure information, and determine a combination from among the one or more combinations of countermeasures in which the number of countermeasures included in the combination is the smallest.

2. The information processing apparatus according to claim 1,
wherein the processor is further configured to output information for specifying each of the identified remaining terminals, in addition to the number of the identified remaining terminals.

3. The information processing apparatus according to claim 1,
wherein in a case where a plurality of countermeasures are selected, the processor is further configured to identify a terminal to which each of the selected plurality of countermeasures is applicable, on the basis of the terminal-specific countermeasure information, and identifies the remaining terminal using a logical sum of terminals identified for each of the countermeasures.

4. An information processing method performed by a computer, the method comprising:

receiving an input indicating that at least one countermeasure is selected from among a plurality of countermeasures against vulnerability;

reading out terminal-specific countermeasure information, indicating a countermeasure applicable for each of a plurality of terminals against the vulnerability, from a storage that stores the terminal-specific countermeasure information, and based on an assumption that the selected countermeasure is applied to the plurality of terminals, identifying remaining terminals from among the plurality of terminals which are terminals that would be left with the vulnerability due to non-applicability of the selected countermeasure based on the read-out terminal-specific countermeasure information;

counting a number of terminals identified as the remaining terminals; and displaying a screen including first information indicating the number of remaining terminals;

wherein the information processing method further comprises determining one or more combinations of countermeasures in which the number of the remaining terminals is the smallest based on the terminal-specific countermeasure information, and determining a combination from among the one or more combinations of countermeasures in which the number of countermeasures included in the combination is the smallest.

5. A non-transitory computer readable medium storing a program for causing a computer to execute an information processing method, the information processing method comprising:

receiving an input indicating that at least one countermeasure is selected from among a plurality of countermeasures against vulnerability;

reading out terminal-specific countermeasure information, indicating a countermeasure applicable for each of a plurality of terminals against the vulnerability, from a storage that stores the terminal-specific countermeasure information, and based on an assumption that the selected countermeasure is applied to the plurality of terminals, identifying remaining terminals from among the plurality of terminals which are terminals that would be left with the vulnerability due to non-applicability of the selected countermeasure based on the read-out terminal-specific countermeasure information;

counting a number of terminals identified as the remaining terminals; and displaying a screen including first information indicating the number of remaining terminals;

wherein the information processing method further comprises determining one or more combinations of countermeasures in which the number of the remaining terminals is the smallest based on the terminal-specific countermeasure information, and determining a combination from among the one or more combinations of countermeasures in which the number of countermeasures included in the combination is the smallest.

6. The information processing apparatus according to claim 1, wherein the screen further includes second information indicating, as to each of the plurality of countermeasures, a number of terminals to which the countermeasure is applicable, and wherein the processor is further configured to update the second information based on identification results of the remaining terminal.

* * * * *